(12) United States Patent
Yamashita et al.

(10) Patent No.: US 11,827,221 B2
(45) Date of Patent: Nov. 28, 2023

(54) VEHICLE AND VEHICLE CONTROL METHOD

(71) Applicant: Panasonic Intellectual Property Management Co., Ltd., Osaka (JP)

(72) Inventors: Hiroki Yamashita, Kanagawa Ken (JP); Shingo Kawahara, Kanagawa Ken (JP); Sumiaki Hazama, Kanagawa Ken (JP); Yoshimasa Okabe, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 310 days.

(21) Appl. No.: 17/212,797

(22) Filed: Mar. 25, 2021

(65) Prior Publication Data

US 2021/0300367 A1 Sep. 30, 2021

(30) Foreign Application Priority Data

Mar. 31, 2020 (JP) .................................. 2020-063817

(51) Int. Cl.
*B60W 30/17* (2020.01)
*G06K 9/00* (2022.01)
*G06V 20/58* (2022.01)

(52) U.S. Cl.
CPC ........... *B60W 30/17* (2013.01); *G06V 20/584* (2022.01); *B60W 2420/42* (2013.01); *B60W 2420/52* (2013.01); *B60W 2420/54* (2013.01)

(58) Field of Classification Search
CPC ............. B60W 30/17; B60W 2420/42; B60W 2420/52; B60W 2420/54; G06V 20/584
See application file for complete search history.

(56) References Cited

U.S. PATENT DOCUMENTS

2020/0004267 A1* 1/2020 Huang ................. G05D 1/0223

FOREIGN PATENT DOCUMENTS

CN 105128729 A * 12/2015
JP H09-311930 12/1997
(Continued)

OTHER PUBLICATIONS

Japanese Office Action dated Nov. 2, 2021 issued in Japanese patent application No. 2020-063817 along with corresponding English machine translation.

*Primary Examiner* — Peter D Nolan
*Assistant Examiner* — Demetra R Smith-Stewart
(74) *Attorney, Agent, or Firm* — GREENBLUM & BERNSTEIN, P.L.C.

(57) ABSTRACT

A vehicle including a vehicle control device is disclosed. The vehicle control device determines whether an object is a preceding vehicle and whether a brake light of the preceding vehicle is on or off. When the object is a preceding vehicle and its brake light is on, the vehicle control device transmits a braking request that instructs a braking control device to stop the vehicle at a position at which an inter-vehicle distance between the preceding vehicle and the vehicle is equal to or larger than a first distance. When the object is a preceding vehicle and its brake light is off, the vehicle control device transmits a braking request that instructs the braking control device to stop the vehicle at a position at which the inter-vehicle distance is equal to or larger than a second distance being smaller than the first distance.

13 Claims, 8 Drawing Sheets

(56) References Cited

FOREIGN PATENT DOCUMENTS

| | | | |
|---|---|---|---|
| JP | 3951781 B2 * | 8/2007 | |
| JP | 2015-009599 | 1/2015 | |
| WO | WO-2018171442 A1 * | 9/2018 | ............. B60T 17/22 |

* cited by examiner

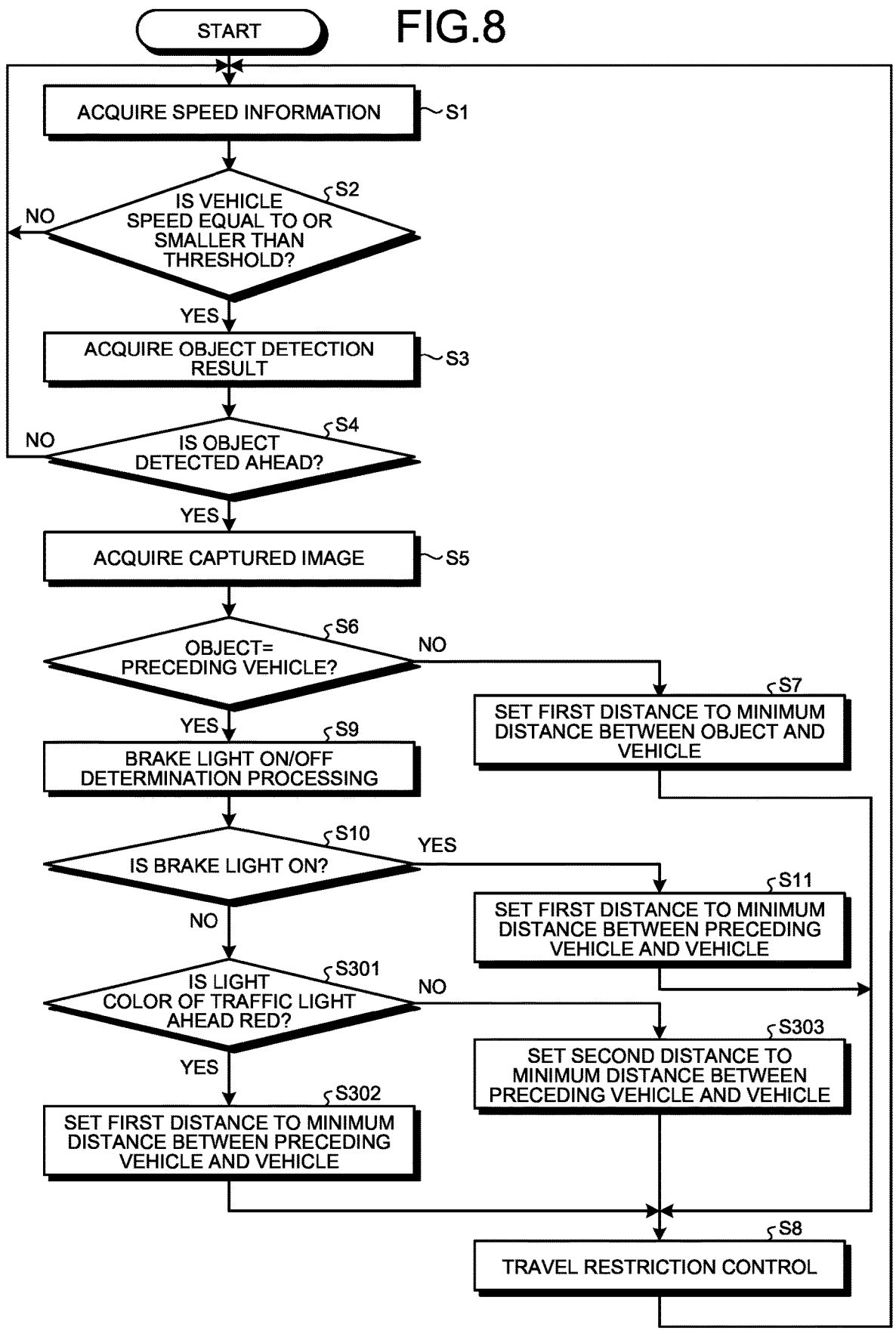

VEHICLE AND VEHICLE CONTROL METHOD

CROSS-REFERENCE TO RELATED APPLICATIONS

This application is based upon and claims the benefit of priority from Japanese Patent Application No. 2020-063817, filed on Mar. 31, 2020, the entire contents of which are incorporated herein by reference.

FIELD

Embodiments of the present disclosure relate to a vehicle and a vehicle control method.

BACKGROUND

Hitherto, there has been known a device mounted on a vehicle to detect an object around the vehicle by using reflection of a sound wave or an electromagnetic wave. There has also been known a technology of suppressing acceleration of a vehicle or executing braking control of the vehicle in order to prevent the vehicle from colliding with an obstacle (for example, Japanese Patent Application Laid-open No. 2015-009599).

However, due to restriction of behavior of a vehicle by such technology, a vehicle sometimes has a difficulty in performing smooth operation in consideration of the situation of surroundings when the vehicle starts to move or accelerates.

Therefore, there is a need for a vehicle to perform smooth operation in consideration of the situation of surroundings of the vehicle when the vehicle starts to move or accelerates.

SUMMARY

A vehicle according to one aspect of the present disclosure includes a vehicle body, a wave transmission/reception device, a first image capture device, a ranging device, a braking control device, and a vehicle control device. The vehicle body is configured to be movable by a plurality of wheels. The wave transmission/reception device is provided on the vehicle body. The wave transmission/reception device is configured to transmit a sound wave or an electromagnetic wave and receive a reflected wave being reflection of the sound wave or the electromagnetic wave from an object. The first image capture device is configured to capture an image of a front view of the vehicle. The ranging device is configured to calculate, by using the reflected wave, a distance between the vehicle and the object. The braking control device is configured to apply brakes to the vehicle body in response to a braking request. The vehicle control device is configured to: determine, based on the image captured by the first image capture device, whether the object is a preceding vehicle and whether a brake light of the preceding vehicle is on or off; when it is determined that the object is a preceding vehicle and a brake light of the preceding vehicle is on, transmit a braking request that instructs the braking control device to stop the vehicle at a position at which an inter-vehicle distance between the preceding vehicle and the vehicle is equal to or larger than a first distance; and, when it is determined that the object is a preceding vehicle and a brake light of the preceding vehicle is off, transmit a braking request that instructs the braking control device to stop the vehicle at a position at which an inter-vehicle distance between the preceding vehicle and the vehicle is equal to or larger than a second distance being smaller than the first distance.

BRIEF DESCRIPTION OF THE DRAWINGS

FIG. 8 is a flow chart illustrating an example of a flow of travel restriction control processing according to a fourth embodiment.

DETAILED DESCRIPTION

In the following, a description is given of embodiments of a vehicle and a vehicle control device according to this disclosure with reference to the drawings.

First Embodiment

Figure 1:
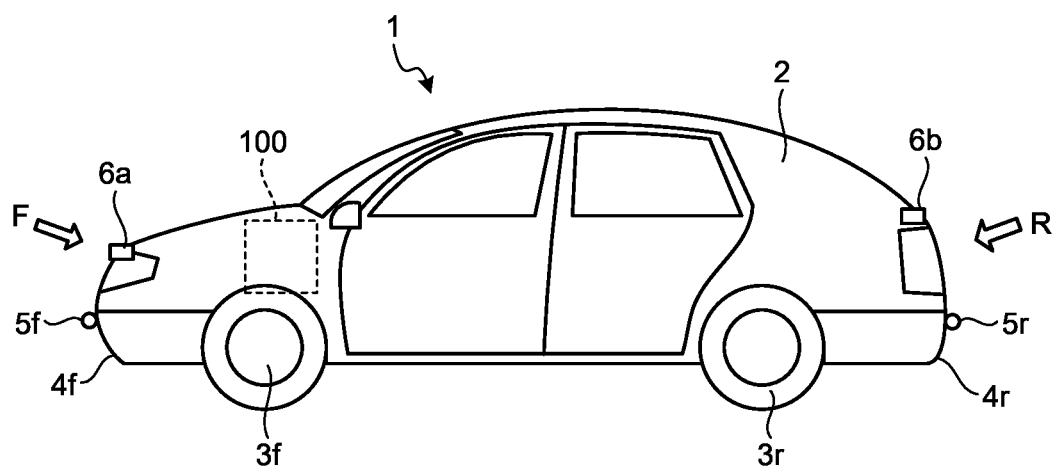
FIG. 1 is a diagram illustrating an example of a vehicle including a vehicle control device according to a first embodiment.

FIG. 1 is a diagram illustrating an example of a vehicle 1 including a vehicle control device according to a first embodiment. As illustrated in FIG. 1, the vehicle 1 includes a vehicle body 2 and two pairs of wheels 3, which are arranged on the vehicle body 2 along a predetermined direction. The two pairs of wheels 3 include a pair of front wheels 3$f$ and a pair of rear wheels 3$r$.

The front wheels 3$f$ illustrated in FIG. 1 are an example of "first wheel" in this embodiment. Furthermore, the rear wheels 3$r$ are an example of "second wheel" in this embodiment. The vehicle 1 illustrated in FIG. 1 includes four wheels 3, but the number of wheels 3 is not limited thereto. For example, the vehicle 1 may be a two-wheeled vehicle.

The vehicle body 2 is connected to the wheels 3, and is capable of moving by the wheels 3. In this case, the predetermined direction along which the two pairs of wheels 3 are arranged is a travel direction (movement direction) of the vehicle 1, and the vehicle 1 can move forward or move backward through switching of a gear, for example. Furthermore, the vehicle body 2 can turn right or left through steering by a driver.

Furthermore, the vehicle body 2 includes a front end portion F, which is an end portion on the side of the front wheels 3$f$, and a rear end portion R, which is an end portion on the side of the rear wheels 3$r$. The vehicle body 2 has a substantially rectangle shape from the viewpoint of the top of the vehicle body 2, and four corners of the substantially rectangle shape may also be referred to as end portions.

A pair of bumpers 4 are provided near the lower ends of the respective front and rear end portions F and R of the vehicle body 2. Among the pair of bumpers 4, a front bumper 4f covers the entire front surface and a part of the side surface around the lower end portion of the vehicle body 2. Among the pair of bumpers 4, a rear bumper 4r covers the entire rear surface and a part of the side surface around the lower end portion of the vehicle body 2.

Wave transmission/reception units 5f and 5r configured to transmit/receive waves such as an ultrasonic wave are arranged at predetermined end portions of the vehicle body 2. For example, one or more wave transmission/reception units 5f are arranged at the front bumper 4f, and one or more wave transmission/reception units 5r are arranged at the rear bumper 4r. The wave transmission/reception units 5f and 5r are hereinafter simply referred to as "wave transmission/reception unit 5" when those transmission/reception units 5f and 5r are not particularly distinguished from each other. Furthermore, the number and positions of wave transmission/reception units 5 are not limited to the example illustrated in FIG. 1.

In this embodiment, as an example of the wave transmission/reception unit 5, a description is given taking sonar that uses ultrasonic waves. Alternatively, the wave transmission/reception unit 5 may be a radar configured to transmit/receive electromagnetic waves. Alternatively, the vehicle 1 may be provided with both of the sonar and the radar.

The vehicle 1 includes a first image capture device 6a configured to capture an image of the front view of the vehicle 1, and a second image capture device 6b configured to capture an image of the rear view of the vehicle 1. The first image capture device 6a and the second image capture device 6b are cameras capable of picking up a color image. Images picked up by the first image capture device 6a and the second image capture device 6b may be moving images or still images. The first image capture device 6a is an example of "first image capture unit" in this embodiment. Furthermore, the second image capture device 6b is an example of "second image capture unit" in this embodiment. In this embodiment, the phrase "image" refers to an image picked up by an image capture device 6 when the image is not particularly limited.

Hereinafter, the first image capture device 6a and the second image capture device 6b are each simply referred to as an "image capture device 6" when those first image capture device 6a and second image capture device 6b do not need to be distinguished from each other. Furthermore, it suffices that the vehicle 1 includes at least the first image capture device 6a, and the second image capture device 6b is not indispensable. Furthermore, the vehicle 1 may further include other image capture device in addition to the first image capture device 6a and the second image capture device 6b.

Furthermore, the image capture device 6 may be a camera incorporated into the vehicle 1, or may be a dashboard camera additionally mounted to the vehicle 1, for example.

Furthermore, a vehicle control device 100 is mounted on the vehicle 1. The vehicle control device 100 is an information processing device (a computer) that can be mounted on the vehicle 1, and is, for example, an electronic control unit (ECU) or an on-board unit (OBU) provided inside the vehicle 1. Alternatively, the vehicle control device 100 may be an external device installed near the dashboard of the vehicle 1.

Furthermore, a mobile terminal such as a smartphone may be used as an example of the vehicle control device 100. When this configuration is adopted, it is assumed that the mobile terminal acquires information such as the speed of the vehicle 1 from the ECU or another similar device mounted on the vehicle 1 via a wireless network or another network.

Figure 2:
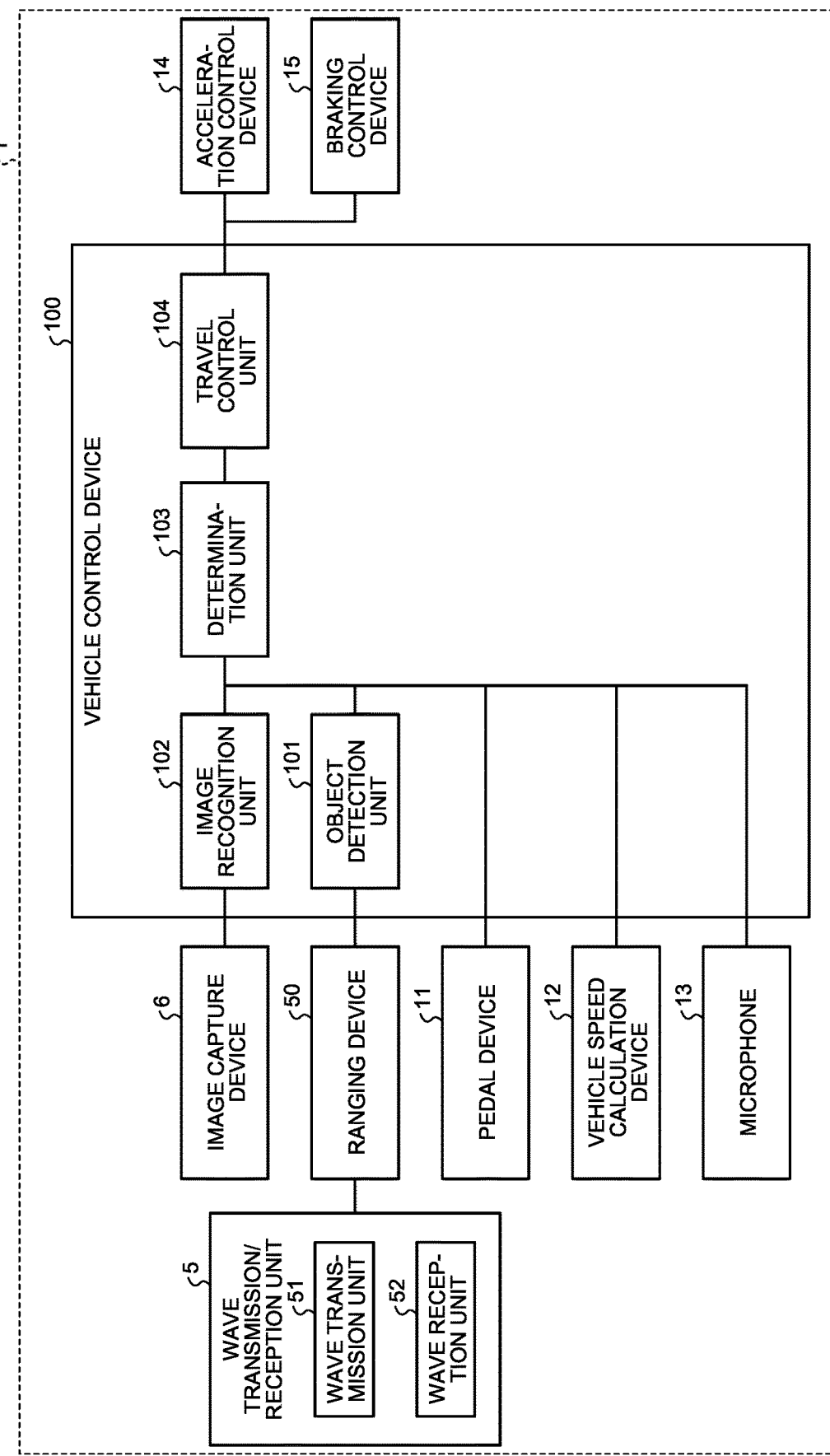
FIG. 2 is a block diagram illustrating an example of a configuration of the vehicle including the vehicle control device according to the first embodiment.

FIG. 2 is a block diagram illustrating an example of a configuration of the vehicle 1 including the vehicle control device 100 according to this embodiment. As illustrated in FIG. 2, the vehicle 1 includes the image capture device 6, the wave transmission/reception unit 5, a ranging device 50, a pedal device 11, a vehicle speed calculation device 12, a microphone 13, an acceleration control device 14, a braking control device 15, and a vehicle control device 100.

The vehicle control device 100, the ranging device 50, the pedal device 11, the vehicle speed calculation device 12, the microphone 13, the acceleration control device 14, and the braking control device 15 are communicably connected to one another via an in-vehicle network, for example. The in-vehicle network is constructed as a controller area network (CAN), for example. Furthermore, the image capture device 6 and the vehicle control device 100 may be connected to each other via the CAN, or may be connected to each other via a dedicated cable, for example.

As illustrated in FIG. 2, the wave transmission/reception unit 5 includes a wave transmission unit 51 and a wave reception unit 52. The wave transmission unit 51 is configured to transmit a sound wave such as an ultrasonic wave or an electromagnetic wave. The wave reception unit 52 is configured to receive a reflected wave, which is reflection of a sound wave or an electromagnetic wave transmitted by the wave transmission unit 51 from an object. In the wave transmission/reception unit 5, the wave transmission unit 51 and the wave reception unit 52 are paired with each other, and the wave reception unit 52 is arranged close to the wave transmission unit 51 so that the wave reception unit 52 can receive a reflected wave originating from a sound wave transmitted by the wave transmission unit 51.

The ranging device 50 is configured to detect an object around the vehicle 1 based on a result of transmitting/receiving a sound wave or an electromagnetic wave by the wave transmission/reception unit 5. For example, the ranging device 50 detects an object based on a reflected wave received by the wave reception unit 52.

In the following, in this embodiment, the object includes, for example, a preceding vehicle, a vehicle crossing in front of the vehicle 1, an obstacle in a road, a wall, or a pedestrian.

More specifically, the ranging device 50 acquires various kinds of signals from the wave transmission/reception unit 5. Signals acquired from the wave transmission/reception unit 5 include, for example, a wave transmission timing signal indicating a timing at which the wave transmission unit 51 has transmitted a sound wave, a wave reception timing signal indicating a timing at which the wave reception unit 52 has received a reflected wave, and a received wave signal indicating a reflected wave received by the wave reception unit 52.

When the strength of a reflected wave indicated by the reflected wave signal is equal to or larger than a predetermined threshold, the ranging device 50 detects an object within a transmission range of a sound wave or an electromagnetic wave. Furthermore, the ranging device 50 uses the wave transmission timing signal acquired from the wave transmission unit 51 and the wave reception timing signal acquired from the wave reception unit 52 to calculate a sound or electromagnetic wave transmission period, which is a period between a time at which a sound or electromagnetic wave was transmitted and reflected from an obstacle (an object) and a time at which the reflected wave is received as a primary reflected wave. Furthermore, the ranging device 50 calculates a transmission distance of the sound wave or electromagnetic wave based on this transmission period. This transmission distance is a round-trip distance between the vehicle 1 and the obstacle. In this manner, the ranging device 50 calculates the distance between the vehicle 1 and the obstacle. The ranging device 50 transmits, as an object detection result, information representing whether an object is detected and information representing the distance between the detected object and the vehicle 1, to the vehicle control device 100 via the in-vehicle network.

Furthermore, the pedal device 11 acquires a depression amount of an acceleration pedal detected by an acceleration sensor, which is not shown, and calculates information on acceleration of the vehicle 1 such as an accelerator position and an accelerator position rate. The pedal device 11 transmits the calculated information on acceleration of the vehicle 1 to the vehicle control device 100 via the in-vehicle network.

The vehicle speed calculation device 12 calculates the vehicle speed of the vehicle 1 based on a wheel speed acquired from a wheel speed sensor, which is not shown. The vehicle speed calculation device 12 may be an ECU different from the vehicle control device 100, for example. The vehicle speed calculation device 12 transmits the calculated vehicle speed of the vehicle 1 to the vehicle control device 100 via the in-vehicle network.

The microphone 13 is configured to detect a sound around the vehicle 1. The number of microphones 13 to be mounted on the vehicle 1 is not particularly limited. The microphones 13 may be installed at, for example, the front and rear end portions of the vehicle 1, respectively. Alternatively, the microphone 13 may be installed at the front end portion of the vehicle 1. The microphone 13 transmits a signal indicating the detected sound to the vehicle control device 100 via the in-vehicle network.

The acceleration control device 14 is configured to control restriction of acceleration of the vehicle 1 in accordance with control by the vehicle control device 100. The acceleration control device 14 is an accelerator actuator, for example. Furthermore, the acceleration control device 14 may transmit information on the speed of the vehicle 1 to the vehicle control device 100. Control of restricting acceleration of the vehicle 1 such that the acceleration is equal to or smaller than a predetermined acceleration is referred to as acceleration suppression.

The braking control device 15 is configured to execute a braking operation of braking the vehicle 1 in accordance with control by the vehicle control device 100. In this embodiment, the braking operation means that the braking control device 15 applies automatic braking in order to stop the vehicle 1. Specifically, when the braking control device 15 has received a braking request from the vehicle control device 100, the braking control device 15 stops the vehicle 1 by applying automatic braking to the vehicle 1. The braking operation may be an operation of reducing the speed of the vehicle 1.

The acceleration suppression (or restriction) and the braking control are each an example of "travel restriction control" of restricting travel of the vehicle 1.

Next, a description is given of functions of the vehicle control device 100. As illustrated in FIG. 2, the vehicle control device 100 includes an object detection unit 101, an image recognition unit 102, a determination unit 103, and a travel control unit 104.

Functions of the object detection unit 101, the image recognition unit 102, the determination unit 103, and the travel control unit 104 are implemented by software. For example, the vehicle control device 100 is constructed as a computer including a central processing unit (CPU), a random access memory (RAM), and a read only memory (ROM). In addition, the vehicle control device 100 may further include a non-volatile storage medium such as a flash memory or a hard disk drive (HDD). Programs to be executed by the vehicle control device 100 in this embodiment are stored in the ROM or the like in advance, for example, and provided. The CPU of the vehicle control device 100 executes those programs to execute the functions of the object detection unit 101, the image recognition unit 102, the determination unit 103, and the travel control unit 104.

The programs to be executed by the vehicle control device 100 in this embodiment may be configured to be recorded in a computer-readable storage medium such as a CD-ROM, a flexible disk (FD), a CD-R, or a digital versatile disc as a file (DVD) in an installable or executable format to be provided. Furthermore, the programs to be executed by the vehicle control device 100 in this embodiment may be configured to be stored in a computer connected to a network such as the Internet, and downloaded over the network to be provided. Furthermore, the programs to be executed by the vehicle control device 100 in this embodiment may be configured to be provided or distributed over a network such as the Internet.

The object detection unit 101 determines the position and size of an object around the vehicle 1 and the distance between the vehicle 1 and the object based on an object detection result obtained by the ranging device 50. Furthermore, the object detection unit 101 may determine whether the object has moved, a movement direction, and a movement speed based on object detection results obtained a plurality of number of times in time series.

Furthermore, the object detection unit 101 may also have the above-mentioned function of the ranging device 50. In this case, the object detection unit 101 detects an object based on a reflected wave received by the wave reception unit 52.

The image recognition unit 102 determines whether a brake light of a preceding vehicle of the vehicle 1 is on, based on an image of the front view of the vehicle 1, which is acquired from the first image capture device 6*a*. For example, the image recognition unit 102 detects the rear surface of the preceding vehicle, which is drawn in the image, by a technique of image processing such as pattern matching. When the image recognition unit 102 has not detected the rear surface of the preceding vehicle based on the image, the image recognition unit 102 determines that there is no preceding vehicle ahead of the vehicle 1.

In this embodiment, the preceding vehicle of the vehicle 1 refers to a vehicle positioned ahead of the vehicle 1 among vehicles travelling or stopped on the same lane as that of the vehicle 1.

Furthermore, the image recognition unit 102 extracts a red image region as a candidate of the brake light from an image region of the image, in which the rear surface of the preceding vehicle is drawn. The image recognition unit 102 detects a pair of brake lights installed at horizontally symmetrical positions of the rear surface of the preceding vehicle within the candidate of the brake light based on the size of the image region of the candidate of the brake light and the position of the candidate of the brake light on the rear surface of the preceding vehicle, for example. Then, the image recognition unit 102 determines whether the brake light is on or off, based on the luminance of an image region in which the detected brake light is drawn.

In this embodiment, the processing of determining whether the brake light of the preceding vehicle is on, based on the image is referred to as "brake light on/off determination processing". The image recognition unit 102 may perform the brake light on/off determination processing based on an image of one frame, or may perform the brake light on/off determination processing by using an image of a plurality of continuous frames. The technique of the brake light on/off determination processing is not limited to the above-mentioned technique.

The determination unit 103 determines whether to ease an execution condition of the travel restriction control of restricting travel of the vehicle 1.

When the speed of the vehicle 1 is equal to or smaller than a threshold, the determination unit 103 determines that the vehicle 1 is stopped or traveling at a low speed. The threshold is, for example, 2 kilometers per hour, but is not limited thereto.

Furthermore, the determination unit 103 determines whether the detected object is a preceding vehicle of the vehicle 1, based on the recognition result obtained by the object detection unit 101 and the image recognition result obtained by the image recognition unit 102. For example, when the image recognition unit 102 has not recognized a preceding vehicle based on the image, the detected object is not a preceding vehicle.

For example, when the detected object is a preceding vehicle and the brake light of the preceding vehicle captured by the first image capture device 6a is on, the determination unit 103 sets a first distance as the minimum inter-vehicle distance between the preceding vehicle and the vehicle 1. The set minimum inter-vehicle distance is stored in a storage device of the vehicle control device 100 such as a RAM or a flash memory, for example.

The minimum inter-vehicle distance between the preceding vehicle and the vehicle 1 is a target inter-vehicle distance that automatic braking is applied by the travel restriction control of the travel control unit 104 described later to cause the vehicle 1 to stop. In this case, when the vehicle 1 has started to move and the travel control unit 104 described later has determined that the distance between the object and the vehicle 1 is to reach the first distance, automatic braking is applied to stop the vehicle 1. Furthermore, in this case, when the inter-vehicle distance between the stopped vehicle 1 and the preceding vehicle is already equal to or smaller than the first distance, automatic braking is applied so as to cause the vehicle not to start to move. Such travel restriction control can reduce the possibility of the vehicle 1 starting to move toward the preceding vehicle due to, for example, erroneous depression of the acceleration pedal by the driver of the vehicle 1 when the vehicle 1 and the preceding vehicle ahead of the vehicle 1 are close to each other.

Figure 3:
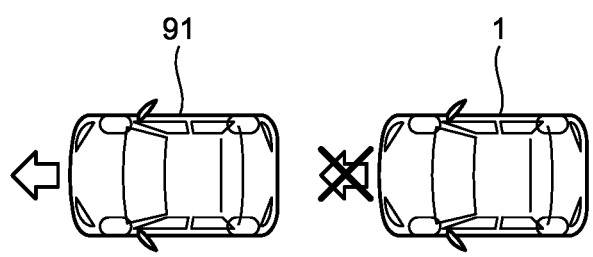
FIG. 3 is a diagram illustrating an example of a positional relation between the vehicle and a preceding vehicle according to the first embodiment.

FIG. 3 is a diagram illustrating an example of a positional relation between the vehicle 1 and a preceding vehicle 91 according to the first embodiment. For example, as illustrated in FIG. 3, it is assumed that the preceding vehicle 91 is positioned ahead of the vehicle 1, and the vehicle 1 and the preceding vehicle 91 are stopped to wait for green of a traffic light, for example. In this case, when the brake light of the preceding vehicle 91 is on and the vehicle 1 has started to move, automatic braking is applied before the inter-vehicle distance between the vehicle 1 and the preceding vehicle 91 reaches the first distance, and thereby the inter-vehicle distance between the vehicle 1 and the preceding vehicle 91 is maintained to be equal to or larger than the first distance.

Furthermore, for example, when the speed of the vehicle 1 is equal to or smaller than the threshold, the detected object is the preceding vehicle 91, and the brake light of the preceding vehicle 91 captured by the first image capture device 6a is off, the determination unit 103 sets a second distance as the minimum inter-vehicle distance between the preceding vehicle and the vehicle 1.

In this case, when the vehicle 1 has started to move and the travel control unit 104 described later has determined that the distance between the object and the vehicle 1 is to reach the second distance, automatic braking is applied to stop the vehicle 1. Furthermore, in this case, when the inter-vehicle distance between the stopped vehicle 1 and the preceding vehicle is already equal to or smaller than the second distance, automatic braking is applied, so that the vehicle 1 does not start to move.

It is assumed that the second distance is smaller than the first distance. In other words, when the brake light of the preceding vehicle 91 is off, the determination unit 103 eases the execution condition of the travel restriction control of restricting travel of the vehicle 1.

In this embodiment, the first distance is 50 m, and the second distance is 40 cm as an example. However, the values of respective distances are not limited thereto. For example, a smaller value may be set as the second distance to substantially cancel restriction of the inter-vehicle distance.

Furthermore, for example, when the detected object is not the preceding vehicle 91, the determination unit 103 sets the first distance as the minimum inter-vehicle distance between the object and the vehicle 1 according to this embodiment, the target distance of the travel restriction control in a case where an object other than the preceding vehicle 91 is detected and the target distance of the travel restriction control in a case where the preceding vehicle 91 with the brake light on are set to the same first distance. However, different distances may be adopted for those target distances.

Furthermore, the determination unit 103 may acquire the state of the gear of the vehicle 1 from the sensor to determine whether the travel direction of the vehicle 1 is the same as the position at which the detected object is present, and the travel restriction control may be executed when the vehicle 1 starts to move in the same direction as the position at which the detected object is present.

Furthermore, a criterion for determining that "the brake light of the preceding vehicle 91 is off" is applied to a case where the brake light of the preceding vehicle 91 is recognized to be off by the image recognition unit 102 based on an image of at least one frame. Alternatively, the criterion for determining that "the brake light of the preceding vehicle 91 is off" may be applied to a case where the brake light of the preceding vehicle 91 is recognized to be off continuously based on a plurality of continuous frames for a predetermined period of time. For example, the determination unit 103 may ease the execution condition of the travel restriction control of restricting travel of the vehicle 1 after a predetermined period of time has elapsed since the brake light of the preceding vehicle 91 has gone off. The predetermined period of time is set to 1 second, for example, but is not limited thereto.

Furthermore, the determination unit 103 may acquire a result of detecting the acceleration of the vehicle 1 by using an acceleration sensor, which is not shown.

Referring back to FIG. 2, the travel control unit 104 transmits a command signal to the acceleration control device 14 or the braking control device 15 based on the determination result obtained by the determination unit 103, to thereby execute the travel restriction control of restricting travel of the vehicle 1.

In this embodiment, when the vehicle 1 is stopped and then starts to move forward, or when the vehicle 1 is traveling at a low speed by creeping and then accelerates, the travel control unit 104 executes the travel restriction control so as to prevent the vehicle 1 from colliding with an object positioned in the travel direction.

For example, the travel control unit 104 transmits a braking request to the braking control device 15, and thereby the braking control device 15 executes a braking operation to automatically apply braking to the vehicle 1.

Furthermore, the timing of transmitting a braking request by the travel control unit 104 may change depending on the speed of the vehicle 1. For example, when the travel control unit 104 executes the travel restriction control such that the inter-vehicle distance between the preceding vehicle and the vehicle 1 becomes equal to or larger than the first distance, the travel control unit 104 transmits a command to execute a braking operation when the inter-vehicle distance between the preceding vehicle and the vehicle 1 takes a larger value as the speed of the vehicle 1 becomes larger.

Next, a description is given of a flow of processing to be executed by the vehicle control device 100 in this embodiment configured as described above.

Figure 4:
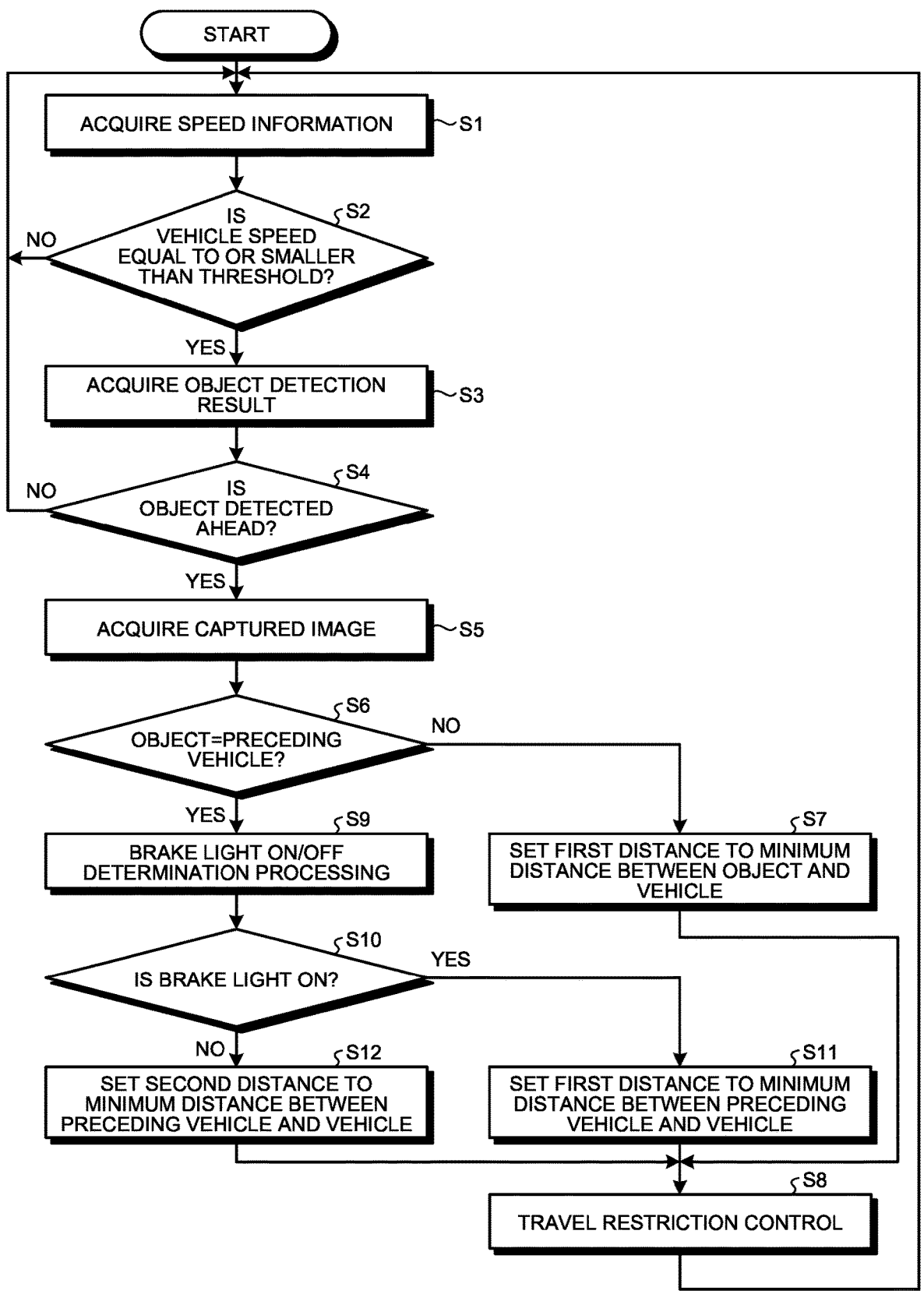
FIG. 4 is a flow chart illustrating an example of a flow of travel restriction control processing according to the first embodiment.

FIG. 4 is a flow chart illustrating an example of a flow of travel restriction control processing according to the first embodiment. At the start point of the processing of this flow chart, the minimum distance between the vehicle 1 and the preceding vehicle 91 or an object other than the preceding vehicle 91 in the travel restriction control is set to the first distance.

Furthermore, the processing of this flow chart is started when an ignition power source of the vehicle 1 is turned on, for example. Furthermore, in this flow chart, it is assumed that the vehicle 1 is stopped or is traveling at a low speed to wait for green of the traffic light, for example.

First, the determination unit 103 of the vehicle control device 100 acquires speed information indicating the vehicle speed of the vehicle 1 from the vehicle speed calculation device 12 (S1)

Then, the determination unit 103 determines whether the speed of the vehicle 1 is equal to or smaller than a threshold (S2). When the determination unit 103 has determined that the speed of the vehicle 1 is larger than the threshold ("No" at S2), the determination unit 103 determines that the vehicle 1 is not stopped or traveling at a low speed, and the processing returns to the processing of S1.

Otherwise, when the determination unit 103 has determined that the speed of the vehicle 1 is equal to or smaller than the threshold ("Yes" at S2), the object detection unit 101 acquires an object detection result from the ranging device 50 (S3).

Then, the object detection unit 101 determines whether an object is detected ahead of the vehicle 1 based on the object detection result (S4). When the object detection unit 101 has determined that an object is not detected ahead of the vehicle 1 ("No" at S4), the processing returns to the processing of S1.

Otherwise, when the object detection unit 101 has determined that an object is detected ahead of the vehicle 1 ("Yes" at S4), the image recognition unit 102 acquires a captured image from the first image capture device 6*a* (S5).

The image recognition unit 102 executes processing of detecting the preceding vehicle 91 on the captured image.

Furthermore, the image recognition unit 102 notifies the determination unit 103 of whether the preceding vehicle 91 is detected.

The determination unit 103 determines whether the detected object is the preceding vehicle 91 of the vehicle 1, based on the recognition result obtained by the object detection unit 101 and the image recognition result obtained by the image recognition unit 102 (S6).

When the determination unit 103 has determined that the detected object is not the preceding vehicle 91 of the vehicle 1 ("No" at S6), the determination unit 103 sets the first distance as the minimum inter-vehicle distance between the object and the vehicle 1 in the travel restriction control (S7). At the time of initial execution, the minimum inter-vehicle distance between the object and the vehicle 1 in the travel restriction control is set to the first distance, so that the determination unit 103 does not need to change the minimum inter-vehicle distance.

Then, the travel control unit 104 executes the travel restriction control such that the distance between the object and the vehicle 1 is maintained to be equal to or larger than the first distance, based on the minimum inter-vehicle distance set by the determination unit 103 (S8). For example, when the vehicle 1 has started to move, the travel control unit 104 requests the braking control device 15 to apply automatic braking when the travel control unit 104 has determined, based on the vehicle speed and the distance to the object, that the distance between the object and the vehicle 1 is to reach the first distance. Furthermore, when the distance between the object and the stopped vehicle 1 is already equal to or smaller than the first distance, the travel control unit 104 requests the braking control device 15 to apply automatic braking so as to cause the vehicle 1 not to start to move. After that, the processing returns to the processing of S1, and the processing is repeated.

Furthermore, when the detected object is the preceding vehicle 91 of the vehicle 1 ("Yes" at S6), the image recognition unit 102 executes the brake light on/off determination processing of determining whether the brake light of the preceding vehicle 91 is on, based on the captured image (S9). The image recognition unit 102 notifies the determination unit 103 of whether the brake light is on.

When the brake light of the preceding vehicle 91 is on ("Yes" at S10), the determination unit 103 sets the first distance as the minimum inter-vehicle distance between the preceding vehicle 91 and the vehicle 1 in the travel restriction control (S11).

Then, the travel control unit 104 executes the travel restriction control of S8 such that the distance between the preceding vehicle 91 and the vehicle 1 is equal to or larger than the first distance based on the minimum inter-vehicle distance set by the determination unit 103. For example, in a case that the vehicle 1 has started to move, the travel control unit 104 requests the braking control device 15 to apply automatic braking in response to determining that the distance between the preceding vehicle 91 and the vehicle 1 is to reach the first distance, based on the vehicle speed of the preceding vehicle 91 and the distance between the vehicle 1 and the object. Furthermore, when the inter-vehicle distance between the preceding vehicle 91 and the stopped vehicle 1 is already equal to or smaller than the first distance, the travel control unit 104 requests the braking control device 15 to apply automatic braking, so that the vehicle 1 does not start to move. After that, the processing returns to the processing of S1, and the processing is repeated.

Furthermore, when the brake light of the preceding vehicle 91 is off ("No" at S10), the determination unit 103 sets the second distance as the minimum inter-vehicle distance between the preceding vehicle 91 and the vehicle 1 (S12).

Then, the travel control unit 104 executes the travel restriction control of S8 such that the distance between the preceding vehicle 91 and the vehicle 1 is maintained to be equal to or larger than the second distance, based on the minimum inter-vehicle distance set by the determination unit 103. For example, when the vehicle 1 has started to move and the travel control unit 104 has determined that the distance between the preceding vehicle 91 and the vehicle 1 is to reach the second distance, based on the vehicle speed of the preceding vehicle 91 and the distance between the vehicle 1 and the object, the travel control unit 104 requests the braking control device 15 to apply automatic braking. Furthermore, when the inter-vehicle distance between the preceding vehicle 91 and the stopped vehicle 1 is already equal to or smaller than the second distance, the travel control unit 104 requests the braking control device 15 to apply automatic braking so as to cause the vehicle 1 not to start to move.

In this case, even when the inter-vehicle distance between the preceding vehicle 91 and the vehicle 1 is equal to or smaller than the first distance, the travel control unit 104 determines not to apply automatic braking as long as the inter-vehicle distance is larger than the second distance. After that, the processing returns to the processing of S1, and the processing is repeated.

In this manner, when the detected object is the preceding vehicle 91 and the brake light of the preceding vehicle 91 captured by the first image capture device 6a is on, the vehicle 1 according to this embodiment is controlled to stop at a position at which the inter-vehicle distance between the preceding vehicle 91 and the vehicle is equal to or larger than the first distance. On the other hand, when the brake light of the preceding vehicle 91 captured by the first image capture device 6a is off, the vehicle 1 is controlled to stop at a position at which the inter-vehicle distance between the preceding vehicle 91 and the vehicle 1 is equal to or larger than the second distance being smaller than the first distance. In other words, the criterion for executing the travel restriction control in the vehicle 1 is eased when the brake light of the preceding vehicle 91 is off. Therefore, the vehicle 1 of this embodiment is capable of reducing unnecessary automatic braking after the brake light of the preceding vehicle 91 is off and the driver of the vehicle 1 operates the vehicle 1 to start to move. In addition, the vehicle 1 of this embodiment is capable of starting to move smoothly at the time when the vehicle 1 starts to travel after stopping behind the preceding vehicle 91. In short, in this embodiment, the vehicle 1 can perform smooth operation in consideration of the situation of surroundings when the vehicle 1 starts to move or accelerates.

Furthermore, the vehicle 1 according to this embodiment is controlled not to start to move (that is, controlled to activate automatic braking) when: the detected object is the preceding vehicle 91; the brake light of the preceding vehicle 91 captured by the first image capture device 6a is on; and the inter-vehicle distance between the preceding vehicle 91 and the stopped vehicle 1 is equal to or smaller than the first distance. Furthermore, the vehicle 1 according to this embodiment is controlled not to start to move when: the detected object is the preceding vehicle 91; the brake light of the preceding vehicle 91 captured by the first image capture device 6a is off; and the inter-vehicle distance between the preceding vehicle 91 and the stopped vehicle 1 is equal to or smaller than the second distance. In other words, in a case that the brake light of the preceding vehicle 91 is off, the vehicle 1 according to this embodiment is allowed to start to move even when the inter-vehicle distance between the preceding vehicle 91 and the vehicle 1 is equal to or smaller than the first distance as long as the inter-vehicle distance is larger than the second distance. Therefore, the vehicle 1 according to this embodiment can reduce the possibility of the driver of the vehicle 1 failing to cause the vehicle 1 to start to move due to automatic braking when the brake light of the preceding vehicle 91 is off and the driver of the vehicle 1 tries to cause vehicle 1 to start to move. In addition, the vehicle 1 according to this embodiment can start to move smoothly when the vehicle 1 is stopped behind the preceding vehicle 91 and starts to travel.

Means for implementing each function included in the vehicle 1 according to this embodiment is not limited to the above-mentioned example. For example, the ranging device 50 and the wave transmission/reception unit 5 have been described as separate devices in FIG. 2. However, the ranging device 50 and the wave transmission/reception unit 5 may be constructed as one device. Furthermore, the vehicle control device 100 may have the functions of the ranging device 50 and the vehicle speed calculation device 12.

Furthermore, the vehicle control device 100 has been described as one device in FIG. 2. However, the function of the vehicle control device 100 may be executed by a plurality of devices.

Second Embodiment

In the first embodiment described above, when the brake light of the preceding vehicle 91 is off, the execution condition of the travel restriction control of restricting travel of the vehicle 1 is eased. In a second embodiment, when the brake light of the preceding vehicle 91 is off and an environment surrounding the vehicle 1 satisfies a predetermined condition, the execution condition of the travel restriction control is eased additionally.

For example, when the detected object is the preceding vehicle 91, the brake light of the preceding vehicle 91 captured by the first image capture device 6a is off, and the light color of a traffic light positioned ahead of the vehicle 1 captured by the first image capture device 6a is green, the vehicle control device 100 mounted on the vehicle 1 according to this embodiment executes a braking operation such that the inter-vehicle distance between the preceding vehicle 91 and the vehicle 1 is equal to or larger than a third distance.

Specifically, the determination unit 103 of the vehicle control device 100 has the same function as the foregoing first embodiment, and, in addition, sets the third distance as the minimum inter-vehicle distance between the preceding vehicle and the vehicle 1.

The third distance is a distance smaller than the second distance, and is, for example, 30 cm. However, the third distance is not limited thereto.

Furthermore, a condition for additionally easing the execution condition of the travel restriction control is not limited to the case in which the light color of the traffic light positioned ahead of the vehicle 1 is green. For example, in a case that: the detected object is the preceding vehicle 91; the brake light of the preceding vehicle 91 captured by the first image capture device 6a is off; and at least one of the following conditions (1) to (4) is satisfied, the determination unit 103 in this embodiment sets the third distance as the minimum inter-vehicle distance between the preceding vehicle and the vehicle 1.

(1) The light color of the traffic light positioned ahead of the vehicle 1 in an image captured by the first image capture device 6a is green. (2) The preceding vehicle 91 or a following vehicle (a vehicle traveling behind the vehicle 1) has moved forward. (3) The volume of an engine sound of the preceding vehicle 91 or the following vehicle detected by the microphone 13 has increased. (4) The preceding vehicle 91 or the following vehicle has exhibited behavior caused by a clutch operation.

Specifically, the behavior due to a clutch operation is up-and-down movement of the vehicle body of the preceding vehicle 91 or the following vehicle. Furthermore, the behavior due to a clutch operation may be a change in engine sound due to a clutch operation.

For example, regarding the condition (1), when the light color of the traffic light ahead is green, the preceding vehicle 91 or the following vehicle is likely to start to move forward, and thus the vehicle control device 100 performs control so that the vehicle 1 can travel along the flow of surrounding vehicles by additionally easing the execution condition of the travel restriction control.

Furthermore, regarding the condition (2) as well, when the preceding vehicle 91 has moved forward, after that, the entire vehicle row is likely to start to move forward. Furthermore, when the preceding vehicle 91 or the following vehicle has moved forward and the vehicle 1 remains to be stopped, the vehicle 1 has a risk of being approached by the following vehicle, for example. Thus, the vehicle control device 100 performs control so that the vehicle 1 can travel along the flow of surrounding vehicles by additionally easing the execution condition of the travel restriction control.

Furthermore, regarding the condition (3), when the volume of the engine sound of the preceding vehicle 91 or the following vehicle has increased, the preceding vehicle 91 or the following vehicle is likely to start to move forward, and thus, also in this case, the vehicle control device 100 additionally eases the execution condition of the travel restriction control. Furthermore, for example, when the driver of the following vehicle has warned the vehicle 1 to travel by increasing the engine sound, it may be possible to reduce the possibility of continuation of such behavior of the driver of the following vehicle by the vehicle 1 moving forward due to additional easing of the execution condition of the travel restriction control.

Furthermore, regarding the condition (4), when the preceding vehicle 91 or the following vehicle has exhibited behavior due to a clutch operation, the preceding vehicle 91 or the following vehicle is likely to start to move forward, and thus, also in this case, the vehicle control device 100 additionally eases the execution condition of the travel restriction control.

These conditions may not all be adopted, and only a part of those conditions may be adopted. For example, the determination unit 103 may determine whether to additionally ease the execution condition of the travel restriction control based only on the condition (1). Furthermore, a condition other than these conditions may be incorporated additionally.

The image recognition unit 102 in this embodiment has the same function as the first embodiment. In addition, the image recognition unit 102 recognizes the light color of the traffic light positioned ahead of the vehicle 1, based on the image captured by the first image capture device 6a, and notifies the determination unit 103 of a recognition result indicating whether the light color is green.

Furthermore, the image recognition unit 102 recognizes up-and-down movement of the vehicle body of the preceding vehicle 91 based on the image captured by the first image capture device 6a, and notifies the determination unit 103 of the recognition result. Furthermore, the image recognition unit 102 recognizes up-and-down movement of the vehicle body of the following vehicle of the vehicle 1 based on the image captured by the second image capture device 6b, and notifies the determination unit 103 of the recognition result.

The object detection unit 101 in this embodiment has the same function as the first embodiment, and, in addition, detects whether the preceding vehicle 91 or the following vehicle is moving forward, based on the object detection result obtained by the ranging device 50. Furthermore, in this embodiment, it is assumed that an object is detected not only ahead of the vehicle 1 but also behind the vehicle 1. The object detection unit 101 notifies the determination unit 103 of a detection result representing whether the preceding vehicle 91 and/or the following vehicle is moving forward.

In order to detecting whether the preceding vehicle 91 and/or the following vehicle is moving forward, a change of the preceding vehicle 91 or the following vehicle in a plurality of frames captured by the image recognition unit 102 in time series may be used.

Furthermore, the determination unit 103 uses the microphone 13 to acquire a signal indicating sounds of the surroundings of the vehicle 1 as a sound detection result. The determination unit 103 determines whether the detected sound is an engine sound, and whether the volume of the sound has increased.

The technique of determining an engine sound is not particularly limited. For example, a waveform of a sound signal in a case that a general engine sound is converted into the sound signal by the microphone 13 may be stored in advance in a storage device of the vehicle control device 100 such as a flash memory, and the determination unit 103 may identify an engine sound by comparing the engine sound with the waveform. The processing of identifying an engine sound or other processing may be executed by a device separate from the vehicle control device 100.

Figure 5:
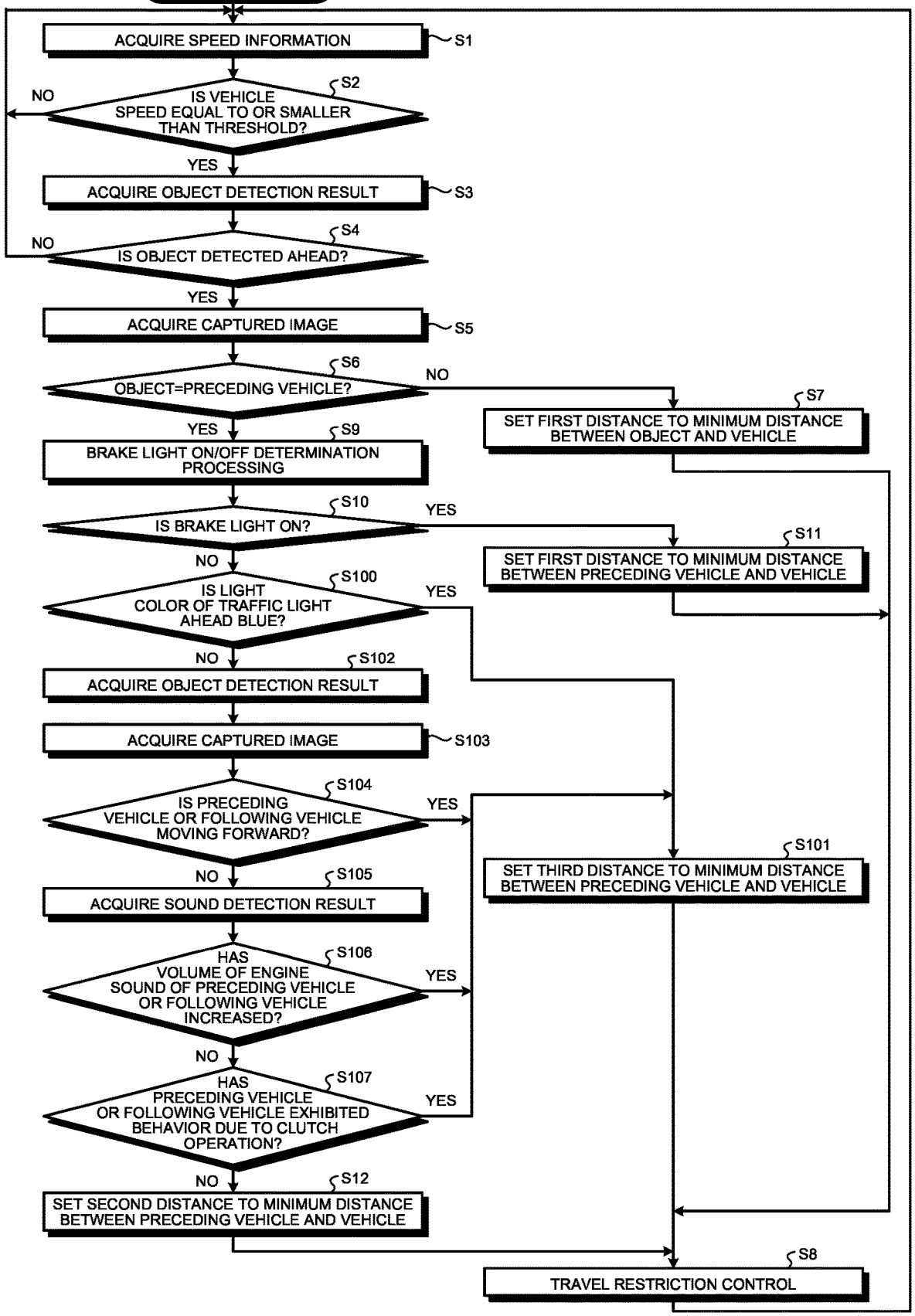
FIG. 5 is a flow chart illustrating an example of a flow of travel restriction control processing according to a second embodiment.

FIG. 5 is a flow chart illustrating an example of a flow of travel restriction control processing according to this embodiment. The processing from acquiring the speed information in S1 to setting the first distance as the minimum distance between the preceding vehicle 91 and the vehicle 1 in S11 is similar to that in the first embodiment. In other words, in this second embodiment, the flow of processing in a case where the execution condition of the travel restriction control is not eased is similar to that of the first embodiment.

Furthermore, when the brake light of the preceding vehicle 91 is off ("No" at S10), the determination unit 103 determines whether the light color of the traffic light positioned ahead of the vehicle 1 is green, based on the image recognition result obtained by the image recognition unit 102 (S100).

When the determination unit 103 has determined that the light color of the traffic light positioned ahead of the vehicle 1 is green ("Yes" at S100), the determination unit 103 sets a third distance as the minimum distance between the preceding vehicle 91 and the vehicle 1 (S101).

Then, the travel control unit 104 executes the travel restriction control of S8 such that the distance between the preceding vehicle 91 and the vehicle 1 is equal to or larger than the third distance based on the minimum inter-vehicle distance set by the determination unit 103. For example, when the vehicle 1 has started to move and the travel control unit 104 has determined that the distance between the preceding vehicle 91 and the vehicle 1 is to reach the third distance based on the vehicle speed of the preceding vehicle 91 and the distance between the vehicle 1 and the object, the travel control unit 104 requests the braking control device 15 to apply automatic braking. Furthermore, when the inter-vehicle distance between the preceding vehicle 91 and the stopped vehicle 1 is already equal to smaller than the third distance, the travel control unit 104 requests the braking control device 15 to apply automatic braking so as to cause the vehicle 1 not to start to move.

In this case, even when the inter-vehicle distance between the preceding vehicle 91 and the vehicle 1 is equal to or smaller than the second distance, the determination unit 103 determines not to apply automatic braking as long as the inter-vehicle distance is larger than the third distance. Thus, the execution condition of the travel restriction control is eased additionally. After that, the processing returns to the processing of S1, and the processing is repeated.

Furthermore, when the determination unit 103 has determined that the light color of the traffic light positioned ahead of the vehicle 1 is not green ("No" at S100), the object detection unit 101 acquires the latest object detection result from the ranging device 50 (S102). The object detection unit 101 detects whether the preceding vehicle 91 or the following vehicle is moving forward based on the obtained object detection result.

Figure 6:
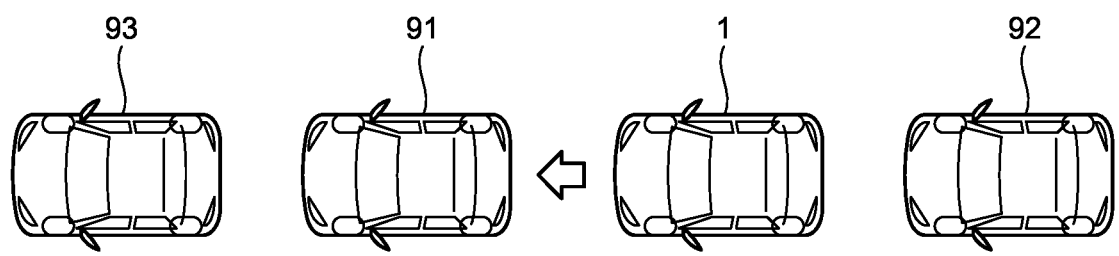
FIG. 6 is a diagram illustrating an example of a positional relation between a vehicle and other surrounding vehicles according to the second embodiment.

FIG. 6 is a diagram illustrating an example of a positional relation between the vehicle 1 and other surrounding vehicles according to this embodiment. It is assumed that each vehicle illustrated in FIG. 6 is stopped to wait for green of the traffic light, for example. In the example illustrated in FIG. 6, the preceding vehicle 91 is positioned ahead of the vehicle 1, and in addition, a preceding vehicle 93 of the preceding vehicle 91 is positioned ahead of the preceding vehicle 91. The preceding vehicle 93 of the preceding vehicle 91 is hereinafter referred to as "further-preceding vehicle 93". Furthermore, a following vehicle 92 is positioned behind the vehicle 1.

The object detection unit 101 detects that the preceding vehicle 91 or the following vehicle 92 is moving forward based on a change in object detection result due to elapse of time, for example.

Furthermore, the image recognition unit 102 acquires a captured image from the first image capture device 6a and the second image capture device 6b (S103). The image recognition unit 102 recognizes up-and-down movement of the vehicle body of the preceding vehicle 91 or the following vehicle 92 based on the captured image, and notifies the determination unit 103 of the recognition result. Furthermore, the image recognition unit 102 may recognize whether the preceding vehicle 91 or the following vehicle 92 is moving forward based on a change of the preceding vehicle 91 or the following vehicle in a plurality of frames captured in time series.

Then, the determination unit 103 determines whether the preceding vehicle 91 or the following vehicle 92 is moving forward based on the detection result obtained by the object detection unit 101 or the recognition result obtained by the image recognition unit 102 (S104).

When the determination unit 103 has determined that the preceding vehicle 91 or the following vehicle 92 is moving forward ("Yes" at S104), the determination unit 103 proceeds to the processing of S101 to additionally ease the execution condition of the travel restriction control.

Furthermore, when the determination unit 103 has determined that the preceding vehicle 91 and the following vehicle 92 are not moving forward ("No" at S104), the determination unit 103 acquires a signal indicating sounds of the surroundings of the vehicle 1 as a sound detection result from the microphone 13 (S105).

Then, the determination unit 103 determines whether the volume of the engine sound of the preceding vehicle 91 or the following vehicle 92 has increased based on the acquired detection result (S106). When the determination unit 103 has determined that the volume of the engine sound of the preceding vehicle 91 or the following vehicle 92 has increased ("Yes" at S106), the determination unit 103 proceeds to the processing of S101, and additionally eases the execution condition of the travel restriction control.

Furthermore, when the determination unit 103 has determined that the volumes of the engine sounds of the preceding vehicle 91 and the following vehicle 92 have not increased ("No" at S106), the determination unit 103 determines whether the preceding vehicle 91 or the following vehicle 92 has exhibited behavior due to a clutch operation such as up-and-down movement of the vehicle body based on the recognition result obtained by the image recognition unit 102 (S107).

When the determination unit 103 has determined that the preceding vehicle 91 or the following vehicle 92 has exhibited behavior due to a clutch operation ("Yes" at S107), the determination unit 103 proceeds to the processing of S101, and additionally eases the execution condition of the travel restriction control.

Furthermore, when the determination unit 103 has determined that the preceding vehicle 91 or the following vehicle 92 has not exhibited behavior due to a clutch operation ("No" at S107), the determination unit 103 sets the second distance as the minimum inter-vehicle distance between the preceding vehicle 91 and the vehicle 1 (S12). In other words, when the detected object is the preceding vehicle 91, the brake light of the preceding vehicle 91 captured by the first image capture device 6a is off, and none of the conditions (1) to (4) is satisfied, the determination unit 103 does not additionally ease the execution condition of the travel restriction control, and eases the execution condition similarly to the first embodiment.

In this manner, the vehicle 1 according to this embodiment stops at a position at which the inter-vehicle distance between the preceding vehicle 91 and the vehicle 1 is equal to or larger than the third distance when the detected object is the preceding vehicle 91, the brake light of the preceding vehicle 91 captured by the first image capture device 6a is off, and the light color of the traffic light positioned ahead of the vehicle 1 captured by the first image capture device 6a is green. Therefore, according to the vehicle 1 according to this embodiment, in addition to the effect of the first embodiment, when the light color of the traffic light positioned ahead of the vehicle 1 is green, it is possible to assist the vehicle 1 in moving forward smoothly in accordance with the flow of surrounding vehicles by additionally easing the execution condition of the travel restriction control.

Furthermore, the vehicle 1 according to this embodiment stops at a position at which the inter-vehicle distance between the preceding vehicle 91 and the vehicle 1 is equal to or larger than the third distance when the detected object is the preceding vehicle 91, the brake light of the preceding vehicle 91 captured by the first image capture device 6a is off, and the preceding vehicle 91 has moved forward. Therefore, according to the vehicle 1 according to this embodiment, it is possible to assist the vehicle 1 in moving forward smoothly in accordance with the flow of surrounding vehicles by additionally easing the execution condition of the travel restriction control in accordance with movement of the preceding vehicle 91.

Furthermore, the vehicle 1 according to this embodiment stops at a position at which the inter-vehicle distance between the preceding vehicle 91 and the vehicle 1 is equal to or larger than the third distance when the detected object is the preceding vehicle 91, the brake light of the preceding vehicle 91 captured by the first image capture device 6a is off, and the following vehicle 92 has moved forward. Therefore, according to the vehicle 1 according to this embodiment, when the following vehicle 92 has moved in such a direction as to approach the vehicle 1, it is possible to reduce the possibility of the following vehicle 92 and the vehicle 1 being excessively close to each other by additionally easing the execution condition of the travel restriction control.

Furthermore, the vehicle 1 according to this embodiment stops at a position at which the inter-vehicle distance between the preceding vehicle 91 and the vehicle 1 is equal to or larger than the third distance when the detected object is the preceding vehicle 91, the brake light of the preceding vehicle 91 captured by the first image capture device 6a is off, and the volume of the engine sound of the preceding vehicle 91 or the following vehicle 92 detected by the microphone 13 has increased. Therefore, according to the vehicle 1 according to this embodiment, it is possible to cause the vehicle 1 to move forward in accordance with movement of the preceding vehicle 91 or cause the vehicle 1 to move forward when the vehicle 1 is warned by the following vehicle 92 by additionally easing the execution condition of the travel restriction control.

Furthermore, the vehicle 1 according to this embodiment stops at a position at which the inter-vehicle distance between the preceding vehicle 91 and the vehicle 1 is equal to or larger than the third distance when the detected object is the preceding vehicle 91, the brake light of the preceding vehicle 91 captured by the first image capture device 6a is off, and the vehicle body of the preceding vehicle 91 or the following vehicle 92 has moved up and down. Therefore, according to the vehicle 1 according to this embodiment, it is possible to detect a clutch operation performed by the preceding vehicle 91 or the following vehicle 92 to prepare to start to move, and allow the vehicle 1 to move forward in accordance with start of movement of the preceding vehicle 91 or the following vehicle 92 by additionally easing the execution condition of the travel restriction control.

Third Embodiment

In the first and second embodiments described above, a description has been given of the case of adopting braking control as an example of the travel restriction control. In a third embodiment, acceleration suppression is executed as the travel restriction control additionally.

In addition to the function described in the first embodiment, the determination unit 103 of the vehicle control device 100 mounted on the vehicle 1 according to this embodiment sets a first acceleration as the maximum acceleration of the vehicle 1 at the time of acceleration suppression when the detected object is the preceding vehicle and the brake light of the preceding vehicle 91 captured by the first image capture device 6a is on.

With this setting, the travel control unit 104 controls the acceleration control device 14 such that the acceleration of the vehicle 1 is maintained to be equal to or smaller than the first acceleration when acceleration suppression is executed as the travel restriction control. It is assumed that the maximum acceleration of the vehicle 1 is set to be the first acceleration at the time of acceleration suppression also when the detected object is an object other than the preceding vehicle 91, for example.

For example, when the driver of the vehicle 1 has depressed the acceleration pedal to cause the vehicle 1 to start to move or accelerate, and the travel control unit 104 has determined that the acceleration is to reach the first acceleration, the travel control unit 104 temporarily cancels a signal transmitted through operation of the acceleration pedal and suppresses acceleration. With such acceleration suppression, occurrence of abrupt acceleration or abrupt start of movement at the time of, for example, erroneous depression of the acceleration pedal instead of a brake pedal is reduced. The technique of suppressing acceleration is not limited thereto.

In this embodiment, it is assumed that a condition for executing acceleration suppression as the travel restriction control is satisfied when a distance between the preceding vehicle 91 or an object other than the preceding vehicle 91 and the vehicle 1 is equal to or smaller than a fourth distance. It is assumed that the fourth distance is larger than any one of the first to third distances. The condition for executing acceleration suppression is not limited thereto, and the acceleration may always be suppressed to the first acceleration or less.

Furthermore, the determination unit 103 sets a second acceleration as the maximum acceleration at the time of acceleration suppression when the detected object is the preceding vehicle, the inter-vehicle distance between the preceding vehicle 91 and the vehicle 1 is equal to or smaller than the fourth distance, and the brake light of the preceding vehicle 91 captured by the first image capture device 6a is off.

With this setting, the travel control unit 104 controls the acceleration control device 14 such that the acceleration of the vehicle 1 is equal to or smaller than the second acceleration when acceleration suppression is executed as the travel restriction control.

It is assumed that the second acceleration is larger than the first acceleration. Specifically, when the brake light of the preceding vehicle 91 is off, the determination unit 103 eases the condition of acceleration suppression among the execution conditions of the travel restriction control of restricting travel of the vehicle 1. As an example, the first acceleration is set to 0.2 G, and the second acceleration is set to 0.5 G. However, the first and second accelerations are not limited to those values. Furthermore, acceleration suppression may be canceled substantially by setting a large value as the second acceleration.

Figure 7:
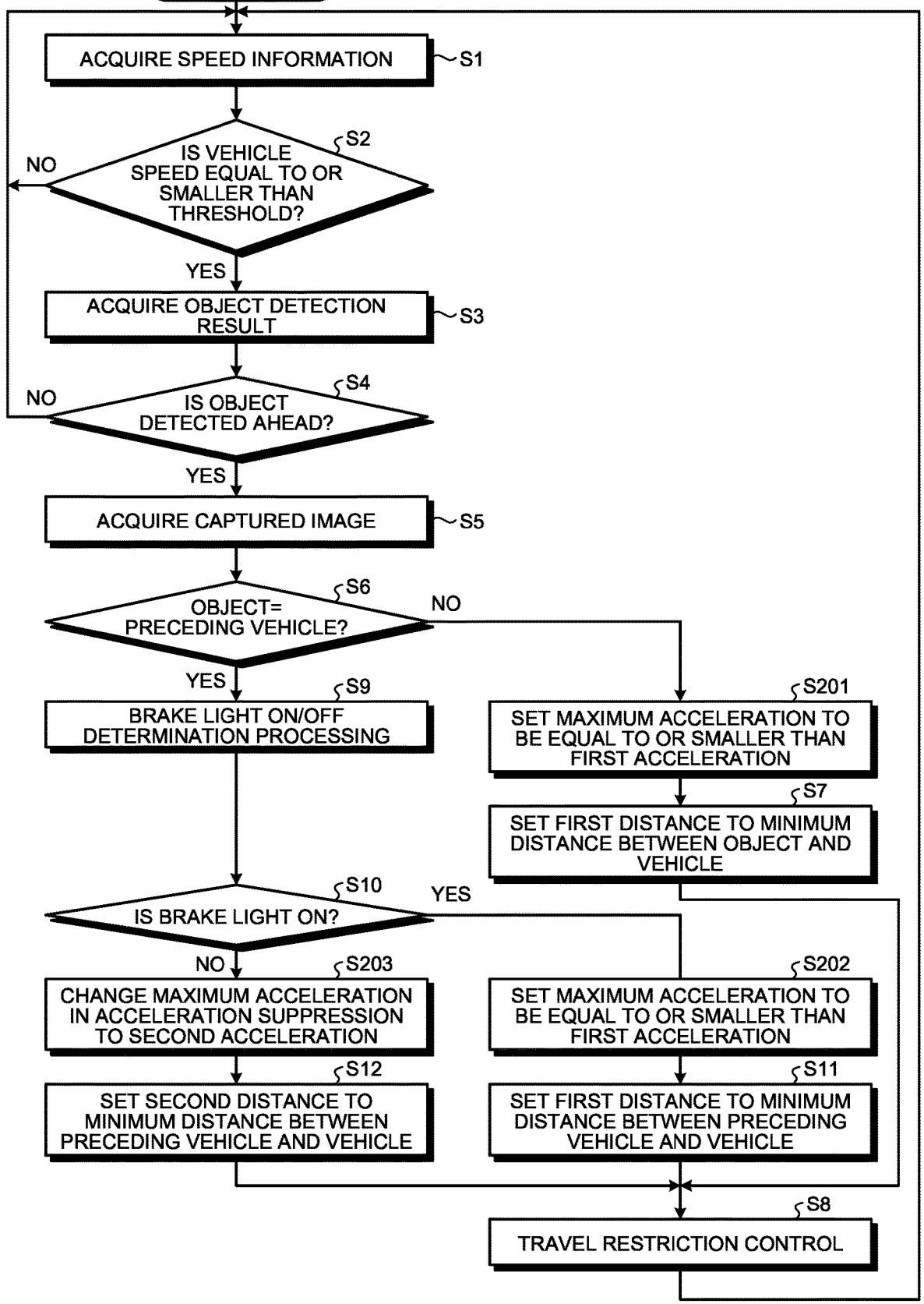
FIG. 7 is a flow chart illustrating an example of a flow of travel restriction control processing according to a third embodiment.

FIG. 7 is a flow chart illustrating an example of a flow of travel restriction control processing according to the third embodiment. When the processing of this flow chart is started, the maximum acceleration is set to be the first acceleration in acceleration suppression of the travel restriction control.

The processing of from acquiring the speed information in S1 to determining whether the detected object is the preceding vehicle 91 in S6 is similar to that of the first embodiment.

Then, when the determination unit 103 has determined that the detected object is not the preceding vehicle 91 of the vehicle 1 ("No" at S6), the determination unit 103 sets the first acceleration as the maximum acceleration in acceleration suppression (S201). The maximum acceleration is set to be the first acceleration in acceleration suppression at the time of initial execution, so that the determination unit 103 may not change the setting of the maximum acceleration.

The processing of setting the first distance as the minimum inter-vehicle distance between the object and the vehicle 1 in S7 is similar to that of the first embodiment. Then, the travel control unit 104 executes the travel restriction control based on the minimum inter-vehicle distance set by the determination unit 103 and the setting of the maximum acceleration in acceleration suppression (S8). In this case, the travel control unit 104 executes the travel restriction control by controlling the acceleration control device 14 and the braking control device 15 such that the distance between the object and the vehicle 1 is equal to or larger than the first distance and the acceleration of the vehicle 1 is equal to or smaller than the first acceleration. After that, the processing returns to the processing of S1, and the processing is repeated.

Furthermore, the brake light on/off determination processing in S9 and the processing of determining whether the brake light is on in S10 are similar to those of the first embodiment.

When the brake light of the preceding vehicle 91 is on ("Yes" at S10), the determination unit 103 sets the first acceleration as the maximum acceleration in acceleration suppression (S202).

The processing of setting the first distance to the minimum inter-vehicle distance between the preceding vehicle 91 and the vehicle 1 in S11 is similar to that of the first embodiment.

Then, the travel control unit 104 executes the travel restriction control based on the minimum inter-vehicle distance set by the determination unit 103 and the setting of the maximum acceleration in acceleration suppression (S8). Specifically, the travel control unit 104 executes the travel restriction control by controlling the acceleration control device 14 and the braking control device 15 such that the distance between the preceding vehicle 91 and the vehicle 1 is equal to or larger than the first distance, and the acceleration of the vehicle 1 is equal to or smaller than the first acceleration. After that, the processing returns to the processing of S1, and the processing is repeated.

When the brake light of the preceding vehicle 91 is off ("No" at S10), the determination unit 103 changes the maximum acceleration in acceleration suppression to the second acceleration (S203).

The processing of setting the second distance as the minimum inter-vehicle distance between the preceding vehicle 91 and the vehicle 1 in S12 is similar to that of the first embodiment.

Then, the travel control unit 104 executes the travel restriction control based on the minimum inter-vehicle distance set by the determination unit 103 and the setting of the maximum acceleration in acceleration suppression (S8). In this case, the travel control unit 104 executes the travel restriction control by controlling the acceleration control device 14 and the braking control device 15 such that the distance between the preceding vehicle 91 and the vehicle 1 is equal to or larger than the second distance and the acceleration of the vehicle 1 is equal to or smaller than the second acceleration. In this case, even when the acceleration exceeds the first acceleration, acceleration suppression is not executed as long as the acceleration of the vehicle 1 is equal to or smaller than the second acceleration. Thus, the travel restriction control is eased. After that, the processing returns to the processing of S1, and the processing is repeated.

In this manner, in the vehicle 1 according to this embodiment, when the detected object is the preceding vehicle 91 and the brake light of the preceding vehicle 91 captured by the first image capture device 6a is on, the first acceleration is set as the maximum acceleration of the vehicle 1. On the other hand, when the detected object is the preceding vehicle 91 and the brake light of the preceding vehicle 91 captured by the first image capture device 6a is off, the second acceleration being larger than the first acceleration is set as the maximum acceleration of the vehicle 1. In other words, according to the vehicle 1 according to this embodiment, in addition to the effect of the first embodiment, the restriction for acceleration suppression in the travel restriction control is eased when the brake light of the preceding vehicle 91 is off. Therefore, according to the vehicle 1 according to this embodiment, it is possible to cause the vehicle 1 to accelerate smoothly when the brake light of the preceding vehicle 91 is off and the driver of the vehicle 1 causes the vehicle 1 to move forward, for example.

In the vehicle control device 100 in this embodiment, it is assumed that the travel restriction control includes braking control similar to that of the first embodiment described above in addition to acceleration suppression. However, only the acceleration suppression may be executed as the travel restriction control. Alternatively, when the vehicle control device 100 executes both of braking control and acceleration suppression as the travel restriction control, the vehicle control device 100 may ease only one of acceleration suppression and braking control.

Fourth Embodiment

In the first to third embodiments described above, a description has been given of the condition for easing the travel restriction control. In a fourth embodiment, a description is given of a condition for suppressing easing of the travel restriction control. For example, in addition to the function of the first embodiment, the determination unit 103 of the vehicle control device 100 mounted on the vehicle 1 according to this embodiment does not ease the travel restriction control when the light color of the traffic light positioned ahead of the vehicle 1 captured by the first image capture device 6a is red.

In this case, even when the brake light of the preceding vehicle 91 is off, the minimum inter-vehicle distance between the preceding vehicle 91 and the vehicle 1 is not eased to be the second distance, and remains to be the first distance.

This is because even in a case where the brake light of the preceding vehicle 91 is off, when the light color of the traffic light ahead is red, the preceding vehicle 91 is not likely to move forward, or is likely to move forward by a short distance.

The image recognition unit 102 in this embodiment has the function of the first embodiment, recognizes the light color of the traffic light positioned ahead of the vehicle 1 based on the image captured by the first image capture device 6a, and notifies the determination unit 103 of a recognition result indicating whether the light color is red.

FIG. 8 is a flow chart illustrating an example of a flow of travel restriction control processing according to this embodiment. The processing of from acquiring the speed information in S1 to setting the first distance as the minimum distance between the preceding vehicle 91 and the vehicle 1 in S11 is similar to that of the first embodiment. Furthermore, when the brake light of the preceding vehicle 91 is off ("No" at S301), the determination unit 103 determines whether the light color of the traffic light positioned ahead of the vehicle 1 is red based on the image recognition result obtained by the image recognition unit 102 (S301).

When the determination unit 103 has determined that the light color of the traffic light positioned ahead of the vehicle 1 is red ("Yes" at S301), the determination unit 103 sets the first distance as the minimum inter-vehicle distance between the preceding vehicle 91 and the vehicle 1 (S302).

Then, the travel control unit 104 executes the travel restriction control of S8 such that the distance between the preceding vehicle 91 and the vehicle 1 is equal to or larger than the first distance based on the minimum inter-vehicle distance set by the determination unit 103. After that, the processing returns to the processing of S1, and the processing is repeated.

When the determination unit 103 has determined that the light color of the traffic light positioned ahead of the vehicle 1 is not red ("No" at S301), the determination unit 103 sets the second distance as the minimum inter-vehicle distance between the preceding vehicle 91 and the vehicle 1 (S303). In this case, the travel restriction control is eased similarly to the first embodiment.

Then, the travel control unit 104 executes the travel restriction control of S8 such that the distance between the preceding vehicle 91 and the vehicle 1 is equal to or larger than the second distance based on the minimum inter-vehicle distance set by the determination unit 103. After that, the processing returns to the processing of S1, and the processing is repeated.

In this manner, the vehicle 1 according to this embodiment stops at a position at which the inter-vehicle distance between the preceding vehicle 91 and the vehicle 1 is equal to or larger than the first distance irrespective of whether the brake light of the preceding vehicle 91 is on when the light color of the traffic light positioned ahead of the vehicle 1 captured by the first image capture device 6a is red. Therefore, according to the vehicle 1 according to this embodiment, it is possible to reduce the possibility of occurrence of collision with the preceding vehicle 91 while at the same time obtaining the effect of the first embodiment.

Modification Example 1

In the fourth embodiment described above, the travel restriction control is not eased when the light color of the traffic light positioned ahead of the vehicle 1 captured by the first image capture device 6a is red. However, the condition for suppressing easing of the travel restriction control is not particularly limited.

For example, when the detected object is the preceding vehicle 91, the brake light of the preceding vehicle 91 captured by the first image capture device 6a is off, and at least one of the following conditions (5) to (8) is satisfied, the determination unit 103 in this modification example does not ease the travel restriction control.

(5) The inter-vehicle distance between the preceding vehicle 91 and the vehicle 1 is equal to or smaller than a threshold. (6) The light color of the traffic light positioned ahead of the vehicle 1 captured by the first image capture device 6a is red. (7) The further-preceding vehicle 93 is not moving forward. (8) A backlight of the preceding vehicle 91 captured by the first image capture device 6a is on.

Regarding the condition (5), the threshold is set to 1 m, for example. For example, in a case where the distance to the object is equal to or larger than 1 m, even when the preceding vehicle 91 is close to the vehicle 1 without moving forward and then the vehicle 1 is braked forcibly, the vehicle 1 can stop without colliding with the preceding vehicle 91. Furthermore, the threshold may be changed depending on the upper limit setting of the acceleration of the vehicle 1.

The condition (6) is similar to that of the fourth embodiment. Furthermore, regarding the condition (7), when the further-preceding vehicle 93 is not moving forward, the preceding vehicle 91 is not likely to move forward, or is likely to move forward by a short distance. Thus, the condition (7) is a condition for suppressing easing of the travel restriction control.

Furthermore, regarding the condition (8), when the backlight of the preceding vehicle 91 is on, the preceding vehicle 91 is likely to move back to the vehicle 1. Thus, when the vehicle 1 moves forward, the inter-vehicle distance may become small excessively, which means that the condition (8) is a condition for suppressing easing of the travel restriction control.

These conditions may not all be adopted, and only a part of those conditions may be adopted. Furthermore, a condition other than these conditions may be incorporated additionally.

Modification Example 2

Furthermore, the first to fourth embodiments described above and the modification examples may be combined appropriately. For example, a condition for additionally easing the execution condition of the travel restriction control in the second embodiment may be applied to easing of acceleration suppression in the third embodiment. Furthermore, for example, both of the condition for additionally easing the execution condition of the travel restriction control in the second embodiment and the condition for suppressing easing of the travel restriction control in the fourth embodiment or the modification example 1 may be combined.

With the vehicle 1 and the vehicle control device 100 according to this disclosure, it is possible to cause the vehicle 1 to perform smooth operation in consideration of the situation of surroundings when the vehicle 1 starts to move or accelerates.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A vehicle comprising:
a vehicle body configured to be movable by a plurality of wheels;
a wave transmission/reception device provided on the vehicle body, the wave transmission/reception device being configured to transmit a sound wave or an electromagnetic wave and receive a reflected wave being reflection of the sound wave or the electromagnetic wave from an object;
a first image capture device configured to capture an image of a front view of the vehicle;

a ranging device configured to calculate, by using the reflected wave, a distance between the vehicle and the object;
a braking control device configured to apply brakes to the vehicle body in response to a braking request; and
a vehicle control device configured to
    determine, based on the image captured by the first image capture device, whether the object is a preceding vehicle and whether a brake light of the preceding vehicle is on or off,
    when it is determined that the object is a preceding vehicle and a brake light of the preceding vehicle is on, transmit a braking request that instructs the braking control device to stop the vehicle at a position at which an inter-vehicle distance between the preceding vehicle and the vehicle is equal to or larger than a first distance, and,
    when it is determined that the object is a preceding vehicle and a brake light of the preceding vehicle is off, transmit a braking request that instructs the braking control device to stop the vehicle at a position at which an inter-vehicle distance between the preceding vehicle and the vehicle is equal to or larger than a second distance being smaller than the first distance,
    wherein the vehicle control device is configured to
    transmit a braking request that instructs the braking control device not to start to move the vehicle when the inter-vehicle distance between the preceding vehicle and the stopped vehicle is equal to or smaller than the first distance while it is determined that the brake light of the preceding vehicle is on, and
    transmit a braking request that instructs the braking control device not to start to move the vehicle when the inter-vehicle distance between the preceding vehicle and the stopped vehicle is equal to or smaller than the second distance being smaller than the first distance while it is determined that the brake light of the preceding vehicle is off.

2. The vehicle according to claim 1, wherein the vehicle control device is configured to
    determine, based on the image captured by the first image capture device, a light color of a traffic light positioned ahead of the vehicle, and
    transmit a braking request that instructs the braking control device to stop the vehicle at a position at which the inter-vehicle distance between the preceding vehicle and the vehicle is equal to or larger than a third distance being smaller than the second distance when it is determined that the light color of the traffic light is green while it is determined that the brake light of the preceding vehicle is off.

3. The vehicle according to claim 1, wherein the vehicle control device is configured to
    determine whether the preceding vehicle has moved forward, and
    transmit a braking request that instructs the braking control device to stop the vehicle at a position at which the inter-vehicle distance between the preceding vehicle and the vehicle is equal to or larger than a third distance being smaller than the second distance when it is determined that the preceding vehicle has moved forward while it is determined that the brake light of the preceding vehicle is off.

4. The vehicle according to claim 1, wherein the vehicle control device is configured to
    determine whether a following vehicle of the vehicle has moved forward, and
    transmit a braking request that instructs the braking control device to stop the vehicle at a position at which the inter-vehicle distance between the preceding vehicle and the vehicle is equal to or larger than a third distance being smaller than the second distance when it is determined that the following vehicle has moved forward while it is determined that the brake light of the preceding vehicle is off.

5. The vehicle according to claim 1, further comprising a microphone configured to detect a surrounding sound of the vehicle,
    wherein the vehicle control device is configured to transmit a braking request that instructs the braking control device to stop the vehicle at a position at which the inter-vehicle distance between the preceding vehicle and the vehicle is equal to or larger than a third distance being smaller than the second distance when a volume of an engine sound of the preceding vehicle or a following vehicle detected by the microphone has increased while it is determined that the brake light of the preceding vehicle is off.

6. The vehicle according to claim 1, wherein the vehicle control device is configured to
    determine, based on the image captured by the first image capture device, whether a vehicle body of the preceding vehicle has moved up and down, and
    transmit a braking request that instructs the braking control device to stop the vehicle at a position at which the inter-vehicle distance between the preceding vehicle and the vehicle is equal to or larger than a third distance being smaller than the second distance when it is determined that the vehicle body of the preceding vehicle has moved up and down while it is determined that the brake light of the preceding vehicle is off.

7. The vehicle according to claim 1, further comprising a second image capture device configured to capture an image of a rear view of the vehicle,
    wherein the vehicle control device is configured to
    determine, based on an image captured by the second image capture device, whether a vehicle body of a following vehicle of the vehicle has moved up and down, and
    transmit a braking request that instructs the braking control device to stop the vehicle at a position at which the inter-vehicle distance between the preceding vehicle and the vehicle is equal to or larger than a third distance being smaller than the second distance when it is determined that the vehicle body of the following vehicle has moved up and down while it is determined that the brake light of the preceding vehicle is off.

8. The vehicle according to claim 1, wherein the vehicle control device is configured to
    determine, based on the image captured by the first image capture device, a light color of a traffic light positioned ahead of the vehicle, and
    transmit a braking request that instructs the braking control device to stop the vehicle at a position at which the inter-vehicle distance between the preceding vehicle and the vehicle is equal to or larger than the first distance when it is determined that the light color of the traffic light is red, irrespective of whether the brake light of the preceding vehicle captured by the first image capture unit is on or off.

9. The vehicle according to claim 1, wherein the vehicle control device is configured to transmit a braking request that instructs the braking control device to stop the vehicle at a position at which a distance between the object and the vehicle is equal to or larger than the first distance when it is determined that the object is not the preceding vehicle.

10. The vehicle according to claim 1, wherein the vehicle control device is configured to detect the object based on the reflected wave.

11. A vehicle comprising:
a vehicle body configured to be movable by a plurality of wheels;
a wave transmission/reception device provided on the vehicle body, the wave transmission/reception device being configured to transmit a sound wave or an electromagnetic wave and receive a reflected wave being reflection of the sound wave or the electromagnetic wave from an object;
a first image capture device configured to capture an image of a front view of the vehicle;
an acceleration control device configured to control acceleration of the vehicle to be equal to or smaller than a maximum acceleration; and
a vehicle control device configured to
determine, based on the image captured by the first image capture device, whether the object is a preceding vehicle and whether a brake light of the preceding vehicle is on or off,
when it is determined that the object is a preceding vehicle and a brake light of the preceding vehicle is on, set a first acceleration as the maximum acceleration of the vehicle, and
when it is determined that the object is a preceding vehicle and a brake light of the preceding vehicle is off, set, as the maximum acceleration of the vehicle, a second acceleration being larger than the first acceleration.

12. A method of controlling a vehicle, the method being implemented by a computer provided in a vehicle including: a vehicle body configured to be movable by a plurality of wheels; a wave transmission/reception device provided on the vehicle body and configured to transmit a sound wave or an electromagnetic wave and receive a reflected wave being reflection of the sound wave or the electromagnetic wave from an object; a first image capture device configured to capture an image of a front view of the vehicle; a ranging device configured to calculate, by using the reflected wave, a distance between the vehicle and the object; and a braking control device configured to apply brakes to the vehicle body in response to a braking request, the method comprising:
determining, based on the image captured by the first image capture device, whether the object is a preceding vehicle and whether a brake light of the preceding vehicle is on or off;
in response to determining that the object is a preceding vehicle and a brake light of the preceding vehicle is on, transmitting a braking request that instructs the braking control device to stop the vehicle at a position at which an inter-vehicle distance between the preceding vehicle and the vehicle is equal to or larger than a first distance;
in response to determining that the object is a preceding vehicle and a brake light of the preceding vehicle is off, transmitting a braking request that instructs the braking control device to stop the vehicle at a position at which an inter-vehicle distance between the preceding vehicle and the vehicle is equal to or larger than a second distance being smaller than the first distance;
transmitting a braking request that instructs the braking control device not to start to move the vehicle when the inter-vehicle distance between the preceding vehicle and the stopped vehicle is equal to or smaller than the first distance while it is determined that the brake light of the preceding vehicle is on; and
transmitting a braking request that instructs the braking control device not to start to move the vehicle when the inter-vehicle distance between the preceding vehicle and the stopped vehicle is equal to or smaller than the second distance being smaller than the first distance while it is determined that the brake light of the preceding vehicle is off.

13. A method of controlling a vehicle, the method being implemented by a computer provided in a vehicle including: a vehicle body configured to be movable by a plurality of wheels; a wave transmission/reception device provided on the vehicle body, the wave transmission/reception device being configured to transmit a sound wave or an electromagnetic wave and receive a reflected wave being reflection of the sound wave or the electromagnetic wave from an object; a first image capture device configured to capture an image of a front view of the vehicle; and an acceleration control device configured to control acceleration of the vehicle to be equal to or smaller than a maximum acceleration, the method comprising:
determining, based on the image captured by the first image capture device, whether the object is a preceding vehicle and whether a brake light of the preceding vehicle is on or off;
in response to determining that the object is a preceding vehicle and a brake light of the preceding vehicle is on, setting a first acceleration as the maximum acceleration of the vehicle; and,
in response to determining that the object is a preceding vehicle and a brake light of the preceding vehicle is off, setting, as the maximum acceleration of the vehicle, a second acceleration being larger than the first acceleration.

* * * * *